United States Patent
Ghoniem et al.

(10) Patent No.: US 9,004,909 B2
(45) Date of Patent: Apr. 14, 2015

(54) INTEGRATED POLYMERIC-CERAMIC MEMBRANE BASED OXY-FUEL COMBUSTOR

(75) Inventors: Ahmed F. Ghoniem, Winchester, MA (US); Alexander Mitsos, Lexington, MA (US); Yang Shao-Horn, Cambridge, MA (US); Mohamed A. Habib, Dhahran (SA); Khaled Mezghani, Dhahran (SA); Rached Ben-Mansour, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 659 days.

(21) Appl. No.: 13/365,290

(22) Filed: Feb. 3, 2012

(65) Prior Publication Data

US 2013/0199425 A1 Aug. 8, 2013

(51) Int. Cl.
*B01J 19/24* (2006.01)
*C01B 13/02* (2006.01)
*F23L 7/00* (2006.01)
*F23L 15/04* (2006.01)
*F23C 99/00* (2006.01)

(52) U.S. Cl.
CPC .............. *C01B 13/0255* (2013.01); *F23L 7/007* (2013.01); *F23L 15/04* (2013.01); *F23C 99/00* (2013.01); *Y02E 20/344* (2013.01)

(58) Field of Classification Search
CPC ..... F23D 14/32; B01J 19/2475; B01J 35/065; A21B 1/10; F23L 7/007

USPC ......... 431/2, 7, 11, 12; 126/39 C, 39 F, 92 C; 250/281, 282; 422/239
See application file for complete search history.

(56) References Cited

U.S. PATENT DOCUMENTS

| | | | |
|---|---|---|---|
| 4,696,686 A | | 9/1987 | Usami et al. |
| 5,108,465 A | * | 4/1992 | Bauer et al. ...................... 95/54 |
| 5,131,225 A | | 7/1992 | Roettger |
| 5,411,580 A | | 5/1995 | Tsuchida et al. |
| 5,534,471 A | * | 7/1996 | Carolan et al. .................... 502/4 |
| 5,827,351 A | * | 10/1998 | Prasad et al. ...................... 95/45 |
| 6,139,604 A | | 10/2000 | Gottzmann et al. |

(Continued)

FOREIGN PATENT DOCUMENTS

| | | |
|---|---|---|
| DE | 102009021623 | 11/2010 |
| EP | 0887099 | 12/1998 |
| EP | 1040861 | 10/2000 |

OTHER PUBLICATIONS

PCT International Search Report mailed Dec. 5, 2013 for International Application No. PCT/US2013/024369.

(Continued)

*Primary Examiner* — Jorge Pereiro
(74) *Attorney, Agent, or Firm* — McLane, Graf, Raulerson & Middleton, PA

(57) ABSTRACT

Integrated polymeric-ceramic membrane-based oxy-fuel combustor. The combustor includes a polymer membrane structure for receiving air at an input and for delivering oxygen-enriched air at an outlet. An oxygen transport reactor including a ceramic ion transport membrane receives the oxygen-enriched air from the polymer membrane structure to generate oxygen for combustion with a fuel introduced into the oxygen transport reactor.

18 Claims, 4 Drawing Sheets

(56) References Cited

U.S. PATENT DOCUMENTS

| | | | |
|---|---|---|---|
| 6,139,810 | A | 10/2000 | Gottzmann et al. |
| 6,153,163 | A | 11/2000 | Prasad et al. |
| 6,319,305 | B1 * | 11/2001 | Phillips et al. ............... 96/4 |
| 6,375,913 | B1 | 4/2002 | Albaugh et al. |
| 6,394,043 | B1 | 5/2002 | Bool, III et al. |
| 6,403,041 | B1 * | 6/2002 | Takahashi et al. ............ 422/240 |
| 6,551,386 | B2 | 4/2003 | Weiler |
| 6,562,104 | B2 | 5/2003 | Bool, III et al. |
| 6,565,632 | B1 | 5/2003 | van Hassel et al. |
| 7,118,612 | B2 | 10/2006 | Shreiber et al. |
| 7,122,072 | B2 * | 10/2006 | Carolan et al. ............... 95/54 |
| 7,125,528 | B2 | 10/2006 | Besecker et al. |
| 7,160,357 | B2 | 1/2007 | Gottzmann |
| 7,442,344 | B2 | 10/2008 | Suzuki et al. |
| 7,875,101 | B2 * | 1/2011 | Staiger et al. ............... 95/54 |
| 7,892,321 | B2 | 2/2011 | Aagesen et al. |
| 8,117,822 | B2 * | 2/2012 | Habib et al. ............... 60/39.181 |
| 8,246,719 | B2 * | 8/2012 | Carolan et al. ............... 95/54 |
| 8,287,762 | B2 * | 10/2012 | Repasky ............... 252/373 |
| 8,590,490 | B2 * | 11/2013 | Habib et al. ............... 122/149 |
| 8,809,773 | B2 * | 8/2014 | Bier ............... 250/288 |
| 8,820,312 | B2 * | 9/2014 | Habib et al. ............... 126/273.5 |
| 2002/0134236 | A1 | 9/2002 | Jensvold et al. |
| 2004/0128975 | A1 * | 7/2004 | Viteri ............... 60/39.55 |
| 2004/0149127 | A1 * | 8/2004 | Lyons et al. ............... 95/45 |
| 2009/0321354 | A1 * | 12/2009 | Heng et al. ............... 210/638 |
| 2010/0116132 | A1 * | 5/2010 | Staiger et al. ............... 95/54 |
| 2011/0131946 | A1 * | 6/2011 | Habib et al. ............... 60/39.181 |
| 2011/0132280 | A1 * | 6/2011 | Habib et al. ............... 122/51 |
| 2011/0240924 | A1 * | 10/2011 | Repasky ............... 252/373 |
| 2011/0288184 | A1 * | 11/2011 | Nardo et al. ............... 518/702 |
| 2013/0139810 | A1 * | 6/2013 | Habib et al. ............... 126/92 C |

OTHER PUBLICATIONS

Coombe, H. Scott and Nieh, S., 2007, Polymer membrane air separation performance for portable oxygen enriched combustion applications, Energy Conversion and Management, vol. 48, pp. 1499-1505.

Bernardo, P., Drioli, E. and Golemme, G., 2009, Membrane Gas Separation: A Review/State of the Art, Ind. Eng. Chem. Res., vol. 48, pp. 4638-4663.

Phair, J.W. and Badwal, S.P.S., 2006, Materials for separation membranes in hydrogen and oxygen production and future power generation, Science and Technology of Advanced Materials, vol. 7, pp. 792-805.

Tan, X., Li, K., Thursfield, A., and Metcalfe, I.S., 2008, Oxyfuel combustion using a catalytic ceramic membrane reactor, Catalysis Today 131, 292-304.

World oil, ceramic membranes for produced water treatment, vol. 230, No. 4, Apr. 2009.

Eriksson, S., 2006, Development catalysts for natural gas-fired gas turbine combustors, Ph.D. Thesis, The Royal Institute of Technology, Stockholm, Sweden.

Kvamsdal, H.M., 2005. Power generation with CO2 management, our activities, Gas Technology Center, NTNU-SINTEF.

Wall, T.F., 2007, Combustion processes for carbon capture, Proceedings of the Combustion Institute, 31, 31-47.

Buhre, B.J.P., Elliott, L.K., Sheng, C.D., Gupta, R.P. and Wall, T.F., 2005, Oxy-fuel combustion technology for coal-fired power generation, Progress in Energy and Combustion Science 31, 283-307.

Mancini, N.D. and Mitsos, A., 2011, Ion Transport Membrane Reactors for Oxy-combustion—Part I: Intermediate Fidelity Modeling. Energy. 36(8):4701-4720.

Mancini, N. D. and Mitsos, A., 2011, Ion Transport Membrane Reactors for Oxy-combustion—Part II: Analysis & Comparison of Alternatives, Energy, 36(8):4721-4739.

Mancini, N.D. and Mitsos, Conceptual design and analysis of ITM oxy-combustion power cycles, 2011, Physical Chemistry Chemical Physics, 13:21351-21361.

Mancini, N.D. , Gunasekaran, S. and Mitsos, A., 2012, A Multiple-Compartment Ion-Transport-Membrane Reactive Oxygen Separator, Industrial & Engineering Chemistry Research, pp. 7988-7997.

* cited by examiner

INTEGRATED POLYMERIC-CERAMIC MEMBRANE BASED OXY-FUEL COMBUSTOR

BACKGROUND OF THE INVENTION

This invention relates to a combustor, and more particularly to an integrated polymeric-ceramic membrane-based oxy-fuel combustor.

Carbon capture is essential to continue the use of fossil fuels while reducing the emissions of $CO_2$ into the atmosphere. Oxy-fuel combustion is an emerging methodology for carbon capture in power and steam generation systems. In oxy-fuel combustion, the fuel is burned in a nitrogen-free environment (pure oxygen diluted with $CO_2$ and $H_2O$) instead of air. Thus, the flue gas mainly consists of $CO_2$ and $H_2O$ that can be easily separated through condensation of $H_2O$. In order to moderate the gas temperature in the absence of $N_2$, part of the flue gases including $CO_2$ is recycled back to the combustion chamber. Among different methods for $O_2$ production, membrane separation is well suited for small-scale and oxygen-enriched air requirements [1, 2]. Membrane separation material options generally fall into one of two categories, polymeric or ceramic. These two membrane types provide very different performance and operating characteristics. The first, polymer membranes, operate at ambient temperatures. Polymer membranes [3] are usually considered for producing $O_2$-enriched air. Polymer membranes and/or zeolites are good for oxygen separation. However, the purity of oxygen is not high, in particular not sufficiently high for oxyfuel combustion with efficient carbon capture. The second type is the high-temperature ceramic membrane or Ion Transport Membranes (ITM). Ceramic membranes produce very high purity oxygen, but they require high operating temperatures [4] and have higher material cost per productivity [5]. The permeability (oxygen flux rate) of ITMs depends on the partial pressure of $O_2$ in the oxygen-nitrogen mixture. Increasing the concentration of $O_2$ by using $O_2$-enriched air rather than air improves the performance of the ITM. Combining polymeric with ceramic membranes can, thus, improve the overall efficiency of the system.

SUMMARY OF THE INVENTION

The invention disclosed herein is a combustor including a polymer membrane structure for receiving air at an input and for delivering oxygen-enriched air at an outlet. An oxygen transport reactor including a ceramic ion transport membrane receives the oxygen-enriched air from the polymer membrane structure to generate oxygen for combustion with a fuel introduced into the oxygen transport reactor. In a preferred embodiment, the oxygen-enriched air from the polymer member structure is compressed and heated before being received by the oxygen transport reactor. The oxygen transport reactor may include a cylindrical ion transport membrane with the oxygen-enriched air flowing along the outside of the ion transport reactor and with fuel flowing along the inside. In this embodiment, means are provided for introducing $CO_2$ along with fuel into the oxygen transport reactor. It is preferred that the oxygen-enriched air and fuel flow in opposite directions.

In another embodiment, the energy for compressing and heating of the oxygen-enriched air comes from expansion of flue gases from the reactor in a turbine device. It is also contemplated to introduce nitrogen-enriched air that was separated from the oxygen-enriched air into a turbine for power production. In a particularly preferred embodiment, the polymer membrane structure and the oxygen transport reactor are integrated into a single unit.

DESCRIPTION OF THE PREFERRED EMBODIMENT

Integrating polymeric and ceramic membranes with combustion systems such as gas turbine combustion chambers [6-9] can provide a high temperature environment and high oxygen flux rates. Fuel on the permeate side of the membrane reacts with any oxygen that is transported through the ITM resulting in very low oxygen concentration on the permeate side. Thus, large concentration gradients across the membrane are maintained achieving high fluxes of oxygen. Moreover, fuel oxidation converts chemical to thermal energy and maintains the high temperature required to activate the materials of the oxygen transport membrane. In order to improve the permeability of $O_2$, $O_2$-enriched air is used instead of air. The $O_2$-enriched air is produced via polymer membranes. Thus, air is separated in the polymer membrane into $O_2$-enriched air and $N_2$-enriched air. Polymer membrane separators are combined in series with the oxygen transport reactors such that the polymer membrane is used to produce $O_2$-enriched air, which is then fed to oxygen transport reactors. Alternatively, the polymer membranes can be integrated with the oxygen transport reactors such that the oxygen is enriched in the polymer membrane, separated in the ion transport membrane and burned with fuel all in one component.

Figure 1:
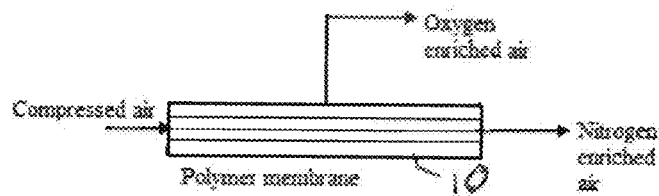
FIG. 1 is a schematic illustration showing air separation in a polymer membrane structure.
Figure 2:
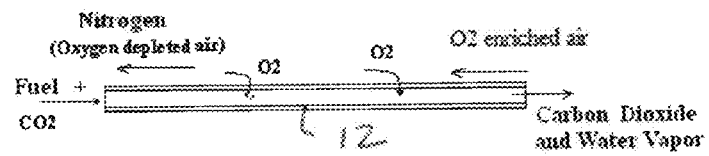
FIG. 2 is a schematic illustration of a single oxygen transport reactor.

In the present invention, a highly efficient carbon-free combustor is disclosed. The combustor comprises two basic components as shown in FIGS. 1 and 2. As shown in FIG. 1 the first component is a polymer membrane structure 10 that produces oxygen-enriched air. The second component is an ion transport membrane (ITM) 12 as shown in FIG. 2 and is used to produce high quality oxygen. The two components 10 and 12 efficiently provide high purity oxygen to burn with fuel thereby producing carbon dioxide and water vapor. The water vapor is separated following expansion and heat extraction and $CO_2$ is captured. Thus, the combustor is a hybrid polymer-ceramic carbon-free unit.

Figure 3:
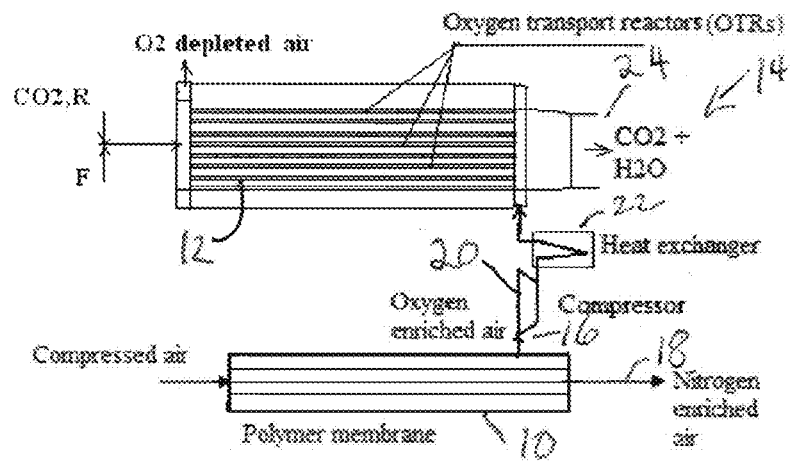
FIG. 3 is schematic illustration of the combustor disclosed herein including a polymer membrane structure and oxygen transport reactors.

With reference now to FIG. 3, the combustor 14 includes a set of polymer membranes 10 and a set of oxygen transport reactors 12. The polymer membranes 10 are used to produce $O_2$-enriched air. In operation, compressed air is introduced into the polymer membranes 10 and is separated into oxygen-enriched air 16 and nitrogen-enriched air 18. The objective is to produce air with a high concentration of $O_2$. The oxygen-enriched air is compressed in a compressor 20 and heated in a heat exchanger 22 before being passed to the oxygen transport reactors 12. The nitrogen-enriched air 18 leaves the polymer membrane 10 for use in other purposes such as for fertilizers or for firefighting applications.

The oxygen transport reactor (OTR) 12 includes a cylindrical ion transport membrane (ITM) in which fuel flows inside the cylindrical membrane and $O_2$-enriched air flows outside, surrounding the outer surface of the membrane. Oxygen-enriched air is obtained using the polymer membrane 10 as shown in FIG. 1.

The rate at which oxygen is separated depends on the partial pressure difference of $O_2$ across the membrane. Utilizing the polymer membrane 10 allows the production of oxygen-enriched air (around 80%) thereby increasing the partial pressure of $O_2$ on the outer side of the ITM by approximately four times. Thus, the flux of $O_2$ across the ion transport membrane (ITM) 12 is increased significantly. The continuous combustion of oxygen as it is transported through the membrane 12 thickness, with fuel, results in a continuous low oxygen partial pressure at the inside surface of the membrane 12. Thus, the ratio of the partial pressures of the oxygen across the sides of the membrane remains high so as to ensure a high flux rate of oxygen separation.

In the combustor disclosed herein, fuel is burned in high quality oxygen resulting from the separation of oxygen by the hybrid polymer and ceramic system. This configuration is expected to result in elevated temperatures of the exhaust gases at the exit of the combustor. In order to provide the ballasting effect that would have been provided by the absent nitrogen and to moderate the exhaust gas temperatures, part of the carbon dioxide in the flue gas 24 ($CO_2$ and $H_2O$) is recycled in the combustion chamber and is mixed with the fuel. Recycling part of the flue gases and mixing them with the fuel provides preheating of the fuel and, thus, provides high temperature in the entrance region of the combustor. High temperature is required to enhance the oxygen flux across the membrane thickness at the entrance region in particular. High temperature is also essential for combustion stability in the entrance region of the combustor. This arrangement also serves to achieve constant temperature distribution along the ceramic membrane 12 and thereby minimizes the stress on the membrane 12. The mixing of $CO_2$ with fuel enables purging of oxygen and ensures low oxygen concentration in the fuel side thereby enhancing the process of oxygen separation in the air side and increasing the oxygen flux rate in the region close to the inlet section of the fuel flow.

Still referring to FIG. 3, compressed oxygen-enriched air is circulated in a direction that is opposite to that of the fuel flow. Thus, air is heated from the combustion gases as they flow from inlet of the combustor toward the combustor outlet and the oxygen-enriched air is heated to provide high temperature of the membrane at the inlet of the combustor thereby enhancing the rate of oxygen flux in the region. The opposite flow arrangement also serves to achieve constant temperature distribution along the ceramic membrane to minimize stress on the membranes.

The oxygen-enriched air produced by the polymer membrane 10 is compressed in the compressor 20 before being passed to the oxygen transport reactor 12. In order to enhance overall system efficiency, the compressed oxygen-enriched air is heated in the heat exchanger 22. The energy required is obtained from the expansion of the flue gases containing $CO_2$ and $H_2O$ in a turbine. The nitrogen-enriched air 18 that is left after oxygen separation from air is removed at the inlet of the combustor. The nitrogen which is at high pressure is used to drive a turbine for power production as those of skill in the art will appreciate. The output work of this turbine compensates for the work required for compression of the oxygen-enriched air and is expected to improve overall system efficiency.

The importance of the polymer membrane 10 is to produce high partial pressure on the outer surface of the ITM thereby achieving high $O_2$ flux through the ITM membrane. The compression of oxygen-enriched air consumes less power in comparison to a similar case of an ITM using air. Thus, the pumping work required for the compression of air at the inlet of the polymer membrane 10 and the oxygen-enriched air (having small volume due to the absence of most of the nitrogen) is expected to be reduced.

Figure 4A:
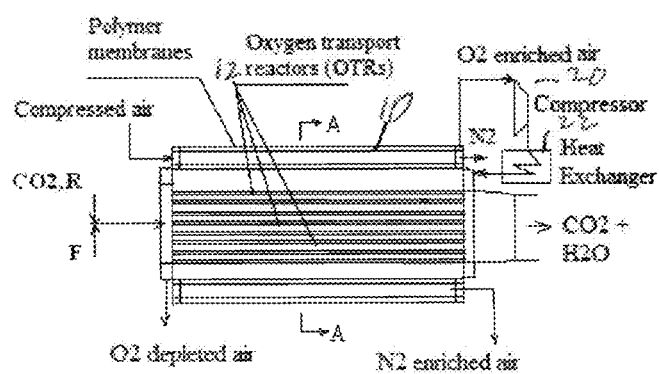
FIG. 4a is a cross-sectional view of the combustor according an embodiment of the invention.
Figure 4B:
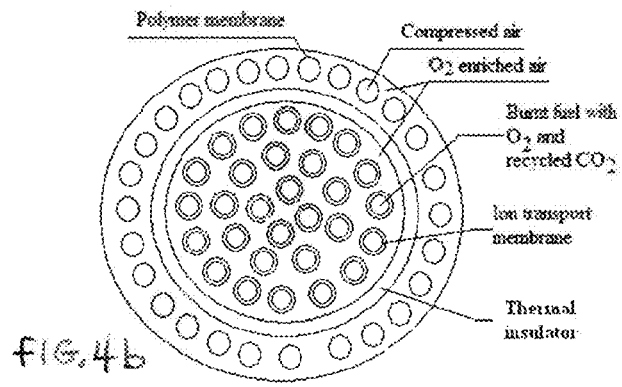
FIG. 4b is a side view of the combustor shown in FIG. 4a along the lines A-A.

Two possible arrangements of the polymer membrane 10 and the ceramic membrane 12 are disclosed herein. In the first arrangement as shown in FIG. 3, the $O_2$-enriched air is produced in the polymer membrane 10 and is then utilized in the oxygen transport membrane 12 (a type of series action). It is also preferred to combine both the polymer membrane 10 and the ion transport membrane 12 to provide onsite separation and combustion as shown in FIG. 4.

Utilizing oxygen-enriched air in the ceramic membranes 12 results in a reduced pressure drop in these membranes. See Table 1. The reduction in pressure drop leads to less variation in pressure along the membranes and ensures high stability of the ceramic membranes 12. Utilizing oxygen-enriched air in the ceramic membranes 12 results in reduced volume/surface of the ceramic membranes and reduces the volume requiring high temperature levels. This also leads to a significantly lower cost of the air separation unit. This result is attributed to the significant reduction in volume and the low material cost per productivity for the polymer membranes 12.

TABLE 1

Improvements due to hybrid polymer ceramic membrane

| System Considered | % Reduction in Volume | % Reduction in Pressure Drop | % Point Increase in Efficiency |
|---|---|---|---|
| Base Counter-Current Separation-Only [11] | 70.8% | 68.6% | — |
| Base Co-Current Reactive [11] | 46.0% | 45.0% | — |
| MCRI [13] | 22.7% | — | — |
| AZEP100H [12] | 54.5% | 36.0% | 1.10% |
| AZEP100 [12] | 64.7% | 62.0% | 0.20% |

EXAMPLE

Figure 5:
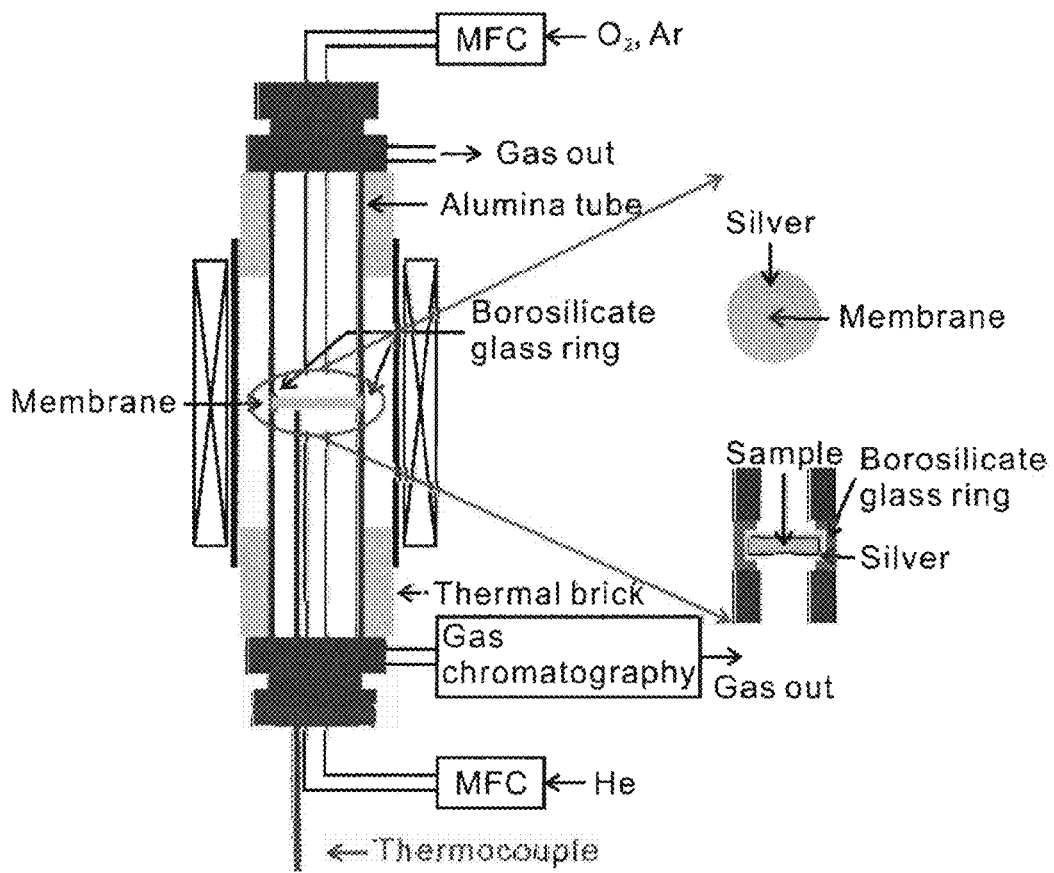
FIG. 5 is a schematic diagram of an experimental setup and sample for oxygen permeation measurement.

It is well-known that the flux of oxygen through a ceramic membrane at a given temperature increases with increasing partial pressure difference of oxygen across the membrane (chemical potential difference). To quantify the effect for the ceramic membranes, of interest, experiments and numerical calculations were conducted varying the partial pressure of oxygen in the feed side on the oxygen flux permeation across the membrane. The oxygen permeation flux was measured with the setup shown in FIG. 5.

Figure 6:
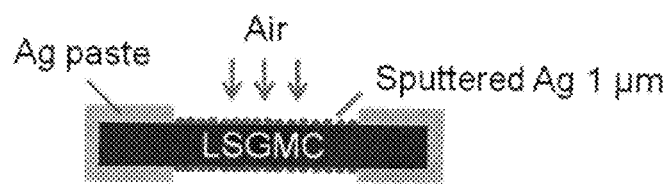
FIG. 6 is a schematic diagram of an oxygen permeation membrane used in the experiments.
Figure 7:
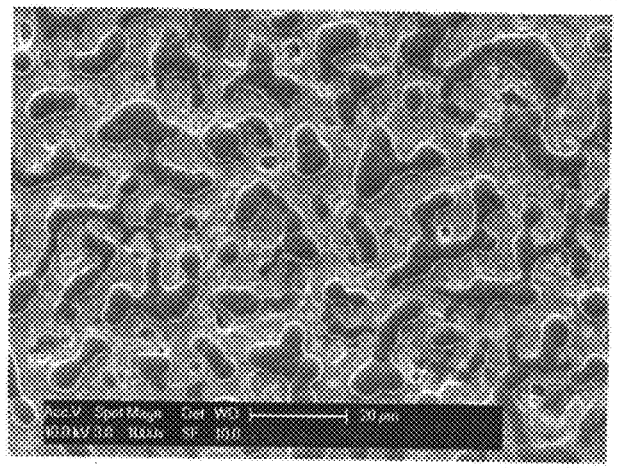
FIG. 7 is an SEM image of the surface of a membrane at the feed side after permeation measurements.

Borosilicate glass rings, whose inner diameter were 13 and 16 mm, were used as the sealant to seal the sample between dense alumina tubes. Silver paste was painted on the area where the sample membrane may contact with borosilicate glass rings to prevent the membrane from reacting with the borosilicate glass. Additionally 1 μm Ag film was sputtered with RF sputtering on the surface of both sides of the membrane as shown in FIG. 6. The Ag film agglomerates into isolated islands after the permeation measurements, which is confirmed by SEM image in FIG. 7. The oxygen permeation flux measurement was performed between 550 and 700° C. The gas mixture of oxygen and argon was introduced into the upper chamber (feed side) as the feed gas, while helium was fed to the lower chamber (permeate side) as the sweep gas. The total inlet gas flow rate on the feed side was fixed at 100 ml min$^{-1}$ and the permeate side was 30 ml min$^{-1}$. The flow rates were controlled by mass flow controllers (MKS instruments Inc., Model M100B). The gas exiting from the permeate side was analyzed with a gas chromatograph (Agilent Technology, 3000A micro GC) equipped with a 30 m molecular sieve column and a TCD detector. Helium gas was used as the carrier gas. Leakages from pores in membranes and connection between borosilicate glass and membranes were checked with the concentration of argon gas at the permeate side. Also, leakage from connection between borosilicate glass and alumina tubes was checked with the concentration of nitrogen gas at the permeate side. No leakage was detected during measurements.

The oxygen permeation flux $J_{O2}$ is then calculated as follows $$J_{O2}=c_{O2}F/S$$

in which $c_{O2}$ is the oxygen concentration at the permeate side detected by the gas chromatograph, F the flow rate of the sweep gas and S the area of the membrane. The experimental data were fitted to the equation $$J_{O2}=A\exp(-B/T)[(P_{O2}')^n-(P_{O2}'')^n]$$

with A, B and n being the parameters for fitting, $P_{O2}'$ and $P_{O2}''$ the oxygen partial pressure at the feed and permeate sides. The fitting was performed via minimizing the least square error between measurements and model prediction using a global optimization solver (BARON) which ensures that the best possible fit is obtained. Most data points are matched very accurately with maximal discrepancy between model and experiment in the order of 20%.

Figure 8:
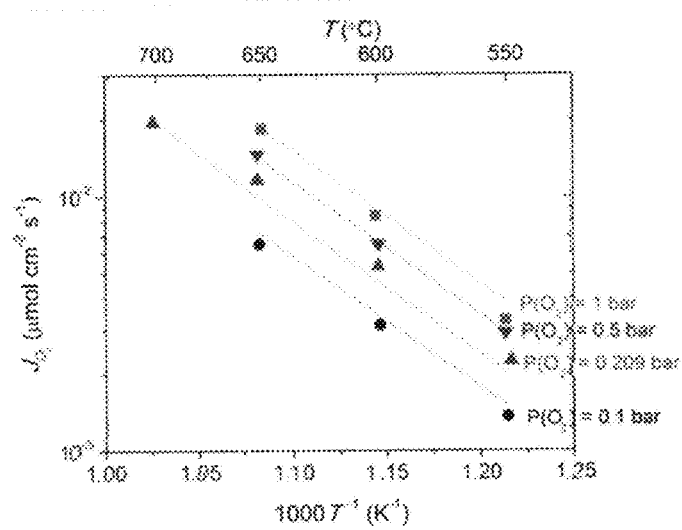
FIG. 8 is a graph of oxygen permeation flux against temperature showing experimental results for the influence of the partial pressure of oxygen in the feed side on the oxygen flux permeation across a membrane at different membrane temperatures.

The oxygen permeation fluxes were found to increase with increasing PO2 (having a PO2 dependence of 0.4) for a range of temperature, as shown in FIG. 8. Additionally, fitting was performed using only A and B as adjustable parameters and fixing n=0.5; the model-experiment discrepancy is slightly higher, but the fit is again very good. This observation suggests that the oxygen permeation flux is limited by the surface oxygen exchange kinetics for the feed side. In addition, the oxygen permeation fluxes obtained experimentally from 550 to 700° C. have similar activation energies in this temperature range.

Figure 9:
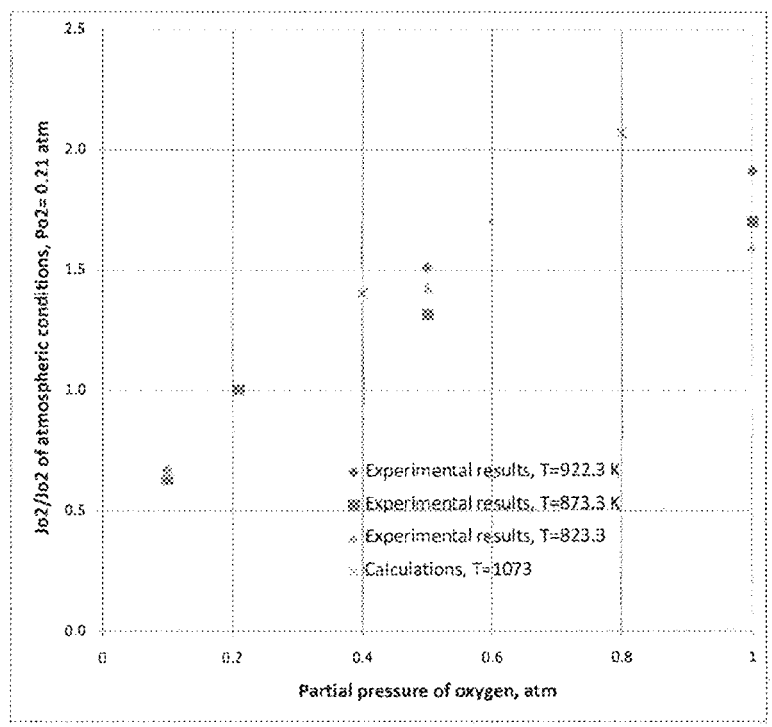
FIG. 9 is a graph showing experimental results and numerical results for the influence of the partial pressure of oxygen in the feed side on the oxygen flux permeation across a membrane.

FIG. 9 quantifies the enhancement of the oxygen permeation as a result of the rise in the oxygen concentration in the feed side considering the ITM reactor on its own. Additionally, preliminary system level simulations for oxy-fuel power cycles with ITM were performed using a semi-detailed ITM model [10-11]. The cycles consider both separation-only ITMs as well as reactive systems, including novel proposals [12-13]. To quantify the potential of the hybrid ceramic/polymeric system, pre-enriched air (80% $O_2$, 20% $N_2$ by mol) was used. Two caveats should be noticed, namely i) the simulation does not consider the penalty and volume associated with the polymeric membrane and ii) the kinetic model used for the ITM [10-11] was fitted to data that did not include high partial pressures of oxygen. In comparison to the base case (79% $N_2$, 21% $O_2$ by mol), the results (Table 1) of $O_2$ pre-enriched air (80% $O_2$ and 20% $N_2$) indicate a noticeable decrease in pressure drop and a significant decrease in surface area/volume required for the ceramic membrane. This indicates a potential to reduce the capital cost substantially. Moreover, the results indicate a slight increase in efficiency.

Figure 10:
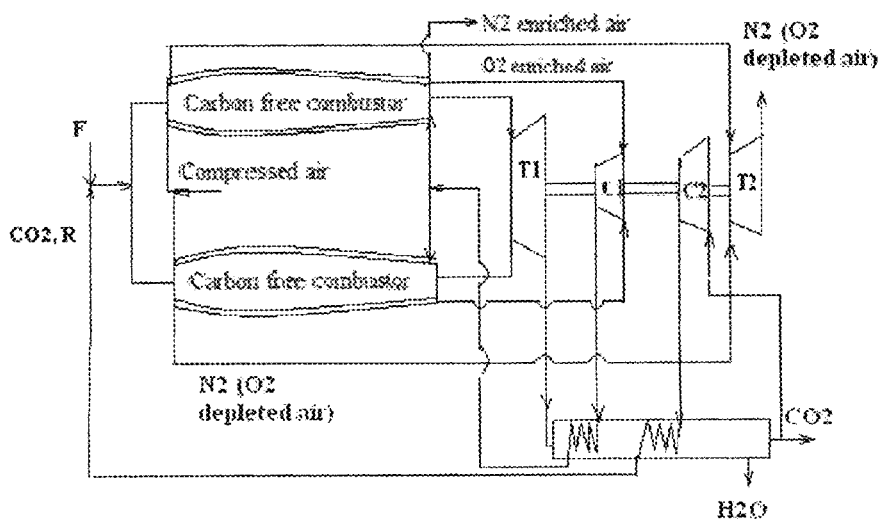
FIG. 10 is a schematic illustration of a hybrid polymer-ceramic free-carbon gas turbine unit according to an embodiment of the invention.

The combustor disclosed herein can be used in real gas turbine engines (FIG. 10) to replace the conventional fuel air combustor, thus, the proposed gas turbine combustion chamber consists of a number of combustors distributed on the perimeter outside the compressor-turbine shaft as in the conventional gas turbine unit. The technology is also suitable for other fossil fuel combustors such as fire and water tube boilers.

The focus of this disclosure is integrated separation and combustion; however, the invention of combining polymeric and ceramic membranes can be used also for separation of oxygen from air without reaction in a combustor.

The numbers in brackets refer to the references listed herein the contents of which are incorporated herein by reference.

It is recognized that modifications and variations of the invention disclosed herein will be apparent to those of ordinary skill in the art and it is intended that all such modifications and variations be included within the scope of the appended claims.

REFERENCES

[1] Scott-Coombe, H. and Nieh, S., 2007, Polymer membrane air separation performance for portable oxygen enriched combustion applications, Energy Conversion and Management, Vol. 48, pp. 1499-1505.
[2] Bernardo, P., Drioli, E. and Golemme, G., 2009, Membrane gas Separation: A review/state of the Art, Ind. Eng. Chem, Res., Vol. 48, pp. 4638-4663.
[3] Phair, J. W. and Badwal, S. P. S., 2006, Materials for separation membranes in hydrogen and oxygen production and future power generation, Science and Technology of Advanced Materials, Vol. 7, pp. 792-805.
[4] Tan, X., Li, K., Thursfield, A., and Metcalfe, I. S., 2008, Oxyfuel combustion using a catalytic ceramic membrane reactor, Catalysis Today 131, 292-304.
[5] World oil, ceramic membranes for produced water treatment, Vol. 230, No. 4, April 2009.
[6] Ericsson, S., 2005, Development of methane oxidation catalysts for different gas turbine combustor concepts, Ph. D. Thesis, The Royal Institute of Technology, Stockholm, Sweden.
[7] Kvamsdal, H. M., 2005. Power generation with $CO_2$ management our activities, Gas Technology Center, NTNU-SINTEF.
[8] Wall, T. F., 2007, Combustion processes for carbon capture, Proceedings of the Combustion Institute 31 (2007) 31-47.
[9] Buhre, B. J. P., Elliott, L. K., Sheng, C. D., Gupta, R. P. and Wall, T. F., 2005, Oxy-fuel combustion technology for coal-fired power generation, Progress in Energy and Combustion Science 31, 283-307.

[10] Mancini, N. D. and Mitsos, A. Ion Transport Membranes for Oxy-combustion Power Cycle Applications: I Intermediate Fidelity Modeling. Energy, (2011), 36(8):4701-4720, 2011.
[11] Mancini, N. D. and Mitsos, A. Ion Transport Membranes for Oxy-combustion Power Cycle Applications: Analysis & Comparison of Alternatives, Energy, 36(8):4721-4739, 2011.
[12] Mancini N. D. and Mitsos, Conceptual Design and Analysis of ITM Oxy-combustion Power Cycles, Physical Chemistry Chemical Physics, 13:21351-21361, 2011.
[13] Mancini, N. D. and Mitsos, A Multiple Compartment Ion Transport Membrane Reactive Oxygen Separator, Submitted: Industrial & Engineering Chemistry Research

What is claimed is:

1. Combustor comprising:
a polymer membrane structure comprising an oxygen-permeable polymer membrane, an inlet for introducing air to a feed side of the polymer membrane, and an outlet for delivering oxygen-enriched air from a permeate side of the polymer membrane;
an oxygen transport reactor including an oxyfuel combustion chamber having an inlet in communication with a source of fuel, and an outlet, an oxygen-permeable ceramic ion transport membrane comprising a feed side disposed to receive the oxygen-enriched air from the polymer membrane structure and a permeate side to deliver oxygen into the oxyfuel combustion chamber for combustion with the fuel introduced into the oxyfuel combustion chamber of the oxygen transport reactor, the oxygen delivered from the permeate side into the oxyfuel combustion chamber having a higher oxygen purity than the oxygen-enriched air from the permeate side of the polymer membrane.

2. The combustor of claim 1, further comprising a compressor disposed to compress the oxygen-enriched air from the polymer membrane structure, and a heat exchanger to heat the oxygen-enriched air before the oxygen-enriched air is received by the oxygen transport reactor.

3. The combustor of claim 2 wherein the heat exchanger and the compressor are in communication with a turbine, wherein the energy for compressing and heating of the oxygen-enriched air comes from expansion of flue gases from the reactor in the turbine.

4. The combustor of claim 1 wherein the ceramic ion transport membrane is cylindrical and surrounds the oxyfuel combustion chamber, the oxygen-enriched air is flowable along an outer surface of the ceramic ion transport membrane and the fuel is flowable along an inside of the ceramic ion transport membrane within the oxyfuel combustion chamber.

5. The combustor of claim 4 wherein the oxygen-enriched air from the polymer membrane structure flows along the outer surface of the ceramic ion transport membrane in an opposite direction from a flow of the fuel along the inside of the ceramic ion transport membrane.

6. The combustor of claim 1 further including an inlet to the oxyfuel combustion chamber in communication with a source of $CO_2$ for introducing $CO_2$ along with the fuel into the oxygen transport reactor.

7. The combustor of claim 6 wherein the source of $CO_2$ comprises $CO_2$ separated from flue gases resulting from combustion in the oxyfuel combustion chamber.

8. The combustor of claim 6 wherein the $CO_2$ and fuel are mixed together.

9. The combustor of claim 1 wherein the polymer membrane structure further includes an outlet disposed to introduce nitrogen-enriched air that was separated from the oxygen-enriched air into a turbine for power production.

10. The combustor of claim 1 wherein the polymer membrane structure and oxygen transport reactor are integrated into a single unit.

11. The combustor of claim 10 wherein the polymer membrane structure is thermally insulated from the oxygen transport reactor.

12. The combustor of claim 1 wherein the polymer membrane structure is thermally insulated from the oxygen transport reactor.

13. The combustor of claim 1 wherein the oxygen partial pressure on the feed side of the ceramic ion transport membrane is increased by the presence of the oxygen-enriched air from the polymer membrane structure.

14. The combustor of claim 1 wherein the oxygen permeation flux across the ceramic ion transport membrane is increased by the presence of the oxygen-enriched air from the polymer membrane structure.

15. The combustor of claim 1 wherein the oxygen permeation flux across the ceramic ion transport membrane is at least $9 \times 10^{-2}$ µmol cm$^{-2}$ s$^{-1}$ at 550° C. and an oxygen partial pressure of 0.209 bar.

16. The combustor of claim 1 wherein the ceramic ion transport membrane has a volume/surface area ratio that is reduced by the presence of the oxygen-enriched air from the polymer membrane structure.

17. The combustor of claim 1 wherein a pressure drop across the ceramic ion transport member is reduced by the presence of the oxygen-enriched air from the polymer membrane structure.

18. The combustor of claim 17 wherein the pressure drop across the ceramic ion transport membrane is reduced by at least 36.0%.

* * * * *